(12) United States Patent
Yaginuma et al.

(10) Patent No.: US 6,500,874 B2
(45) Date of Patent: Dec. 31, 2002

(54) SILICONE RUBBER COMPOSITION, SILICONE RUBBER SPONGE COMPOSITION, AND SILICONE RUBBER-COVERED WIRE

(75) Inventors: Atsushi Yaginuma, Gunma-ken (JP); Terukazu Satoh, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 82 days.

(21) Appl. No.: 09/764,088

(22) Filed: Jan. 19, 2001

(65) Prior Publication Data

US 2001/0011106 A1 Aug. 2, 2001

(30) Foreign Application Priority Data

Jan. 21, 2000 (JP) .......................... 2000-012899
Aug. 8, 2000 (JP) .......................... 2000-239304

(51) Int. Cl.$^7$ .............. C08J 9/06; C08J 9/08; C08G 77/06
(52) U.S. Cl. ............ 521/96; 521/154; 528/24; 528/32; 528/43
(58) Field of Search ............ 528/24, 32, 43; 521/96, 154

(56) References Cited

U.S. PATENT DOCUMENTS 4,743,671 A    5/1988   Dorn et al.

FOREIGN PATENT DOCUMENTS

| JP | A59018758 | 1/1984 |
| JP | A62185750 | 8/1987 |
| JP | A63130663 | 6/1988 |
| JP | A10182972 | 7/1998 |

*Primary Examiner*—Morton Foelak
(74) *Attorney, Agent, or Firm*—Birch, Stewart, Kolasch & Birch. LLP

(57) ABSTRACT

A silicone rubber composition comprising (A) an organopolysiloxane, (B) an inorganic filler, typically fumed silica, and (C) a specific halogen-free organic peroxide, typically 1,6-bis(p-toluoylperoxycarbonyloxy)hexane or 1,6-bis(benzoylperoxycarbonyloxy)hexane is safe and lends itself to atmospheric hot air vulcanization so that it can be extrusion vulcanized into silicone rubber having satisfactory physical properties without voids or surface tack. The silicone rubber composition is extrusion molded around an electrical wire, constructing a covered wire.

14 Claims, No Drawings

SILICONE RUBBER COMPOSITION, SILICONE RUBBER SPONGE COMPOSITION, AND SILICONE RUBBER-COVERED WIRE

This invention relates to a silicone rubber composition of the organic peroxide curing type, especially such a silicone rubber composition suited for wire coating, a silicone rubber sponge composition, and a silicone rubber-covered wire.

BACKGROUND OF THE INVENTION

In the prior art, silicone rubber compositions of the organic peroxide curing type use organic peroxides such as bis(2,4-dichlorobenzoyl)peroxide, 2,5-di(t-butylperoxy) hexane and dicumyl peroxide as the curing agent. An appropriate type and amount of curing agent is selected and used depending on the molding technique of a silicone rubber composition as well as molding temperature and other conditions, and the type of silicone rubber.

Of these organic peroxide curing agents, bis(2,4-dichlorobenzoyl)peroxide is a superior curing agent and widely used in the industry. This is because bis(2,4-dichlorobenzoyl)peroxide is stable at room temperature, achieves the fastest vulcanization as compared with other curing agents and offers high productivity. As the significant feature, this curing agent is most effective under atmospheric hot air vulcanization (HAV) conditions.

However, bis(2,4-dichlorobenzoyl)peroxide produces chlorine by-products when thermally decomposed. The molding time is undesirably prolonged because long-term heat treatment is needed to remove the chlorine by-products. It is believed from the environmental standpoint that the use of peroxide curing agents which will form such chlorine by-products becomes difficult or inhibited.

From such a standpoint, there is a need for a peroxide curing agent substitute for bis(2,4-dichlorobenzoyl) peroxide. JP-A 62-185750 discloses bis(p-methylbenzoyl) peroxide as the halogen-free peroxide curing agent. JP-A 63-130663 discloses 1,3-bis(t-butylperoxy-carbonyloxy)-2, 2-dimethylpropane as a halogen-free peroxide curing agent. These peroxide curing agents have high decomposition temperatures and suffer from the drawbacks of a slow vulcanization rate and poor productivity.

For the vulcanization of wire coating silicone rubber compositions, various techniques are used depending on the type of silicone rubber composition and the physical properties required for the cured rubber. In general, heat treatment in the presence of organic peroxides is widely used. Such organic peroxides include benzoyl peroxide, bis(p-chlorobenzoyl)peroxide, bis(2,4-dichlorobenzoyl)peroxide, dicumyl peroxide, di-t-butyl peroxide, 2,5-dimethyl-2,5-di (t-butylperoxy)hexane, t-butyl perbenzoate, and t-butyl cumyl peroxide. As the vulcanizing agents which ensure that cost effective silicone rubber-covered wires having good properties are manufactured through extrusion hot air vulcanization, bis(2,4-dichlorobenzoyl)peroxide and other halogen-containing peroxides are customary. However, when halogen-containing organic peroxides are used, decomposed products thereof are left in molded parts after curing, which will bleed out on the surface with the lapse of time. Because of their own poisoning effect, long-term post-curing is necessary.

To solve these problems, for example, JP-A 59-18758 proposes the use of bis(o-methylbenzoyl)peroxide as the curing agent in silicone rubber compositions. The use of bis(p-methylbenzoyl)peroxide is also proposed as the curing agent in silicone rubber compositions. These curing agents in the form of methyl-substituted benzoyl peroxide have a high decomposition temperature and a low vulcanization rate so that silicone rubber compositions using such curing agents tend to generate voids upon curing. As a consequence, silicone rubber molded parts often have varying physical properties, and coated wires undergo a lowering of breakdown voltage such as spark-over.

Meanwhile, silicone rubber sponge has physical properties inherent to silicone rubber as well as excellent properties including heat resistance, freeze resistance, electrical insulation, flame retardance and compression set. Basically, silicone rubber sponge is manufactured by combining a heat-curable silicone rubber composition with a curing agent and a blowing agent, and heating the composition for blowing and curing, thereby forming a sponge. In this process, a blowing ability, a uniform fine cell structure, and a skin layer having a smooth tack-free surface are important, and the physical properties inherent to silicone rubber must be retained.

With respect to the molding method, the compositions are cured and expanded in atmospheric hot air so that continuous molding is possible. Organic peroxides enabling atmospheric hot air vulcanization are generally halogen-containing peroxides such as bis(2,4-dichlorobenzoyl)-peroxide. When halogen-containing organic peroxides are used, there arise the problems that decomposed products left in molded parts after curing will bleed out on the surface with the lapse of time, and long-term post-curing is necessary because of the decomposed products' own poisoning effect as previously mentioned.

Halogen-free benzoyl peroxide allows for atmospheric hot air vulcanization, but fails to provide satisfactory sponge properties with respect to expansion and cell structure.

Then JP-A 10-182972 proposes the use of alkyl-substituted benzoyl peroxides as a halogen-free curing agent. These peroxides have a high decomposition temperature and a low vulcanization rate, leading to low productivity, and fail to provide satisfactory sponge properties with respect to expansion and cell structure.

SUMMARY OF THE INVENTION

Therefore, an object of the invention is to provide a silicone rubber composition, especially for electrical wire coating, which has a high vulcanization rate and hygienic safety, and can be extrusion vulcanized in a continuous atmospheric hot air vulcanization manner into a silicone rubber part without voids or surface tack. Another object is to provide a silicone rubber-covered wire using the silicone rubber composition and having improved withstand voltage properties.

A further object of the invention is to provide a silicone rubber sponge composition which can be cured with halogen-free organic peroxides without detracting from working efficiency and has a reduced post-cure time, as compared with halogen-containing organic peroxides, and which is effectively expandable into a silicone rubber sponge having a uniform fine cell structure and a skin layer with a smooth, tack-free surface.

It has been found that when organic peroxides of the following structural formula (2), which are halogen free, are used as the curing agent in silicone rubber compositions, these organic peroxides create no environmental problem, have a high vulcanization rate satisfactory for productivity, and function well under atmospheric hot air vulcanization conditions. These organic peroxides are thus effective for producing silicone rubber or silicone rubber sponge with satisfactory physical properties. When wires are covered with the silicone rubber compositions, extrusion vulcanization can be effected without giving rise to such problems as voids and surface tackiness, and the resulting silicone rubber coating has improved withstand voltage properties. The invention is predicated on these findings.

According to the invention, there is provided a silicone rubber composition comprising (A) an organopolysiloxane of the average compositional formula (1), (B) an inorganic filler, and (C) an organic peroxide of the structural formula (2).

(1)

Herein $R^1$ is a substituted or unsubstituted monovalent hydrocarbon group and "a" is a positive number of 1.8 to 2.3.

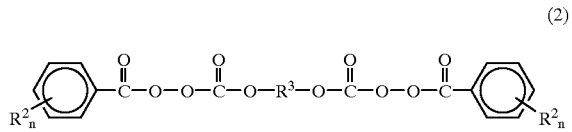

(2)

Herein $R^2$ is independently hydrogen or alkyl, $R^3$ is alkylene, and n is an integer of 1 to 3.

Also provided herein is a silicone rubber-covered wire comprising a wire around which the silicone rubber composition has been extrusion molded.

The invention also provides a silicone rubber sponge composition further comprising (E) an organic blowing agent in addition to the above components.

DESCRIPTION OF THE PREFERRED EMBODIMENT

Component (A) of the silicone rubber composition according to the invention is an organopolysiloxane of the average compositional formula (1).

(1)

In formula (1), $R^1$ which may be the same or different is a substituted or unsubstituted monovalent hydrocarbon group, preferably of 1 to 12 carbon atoms, more preferably 1 to 8 carbon atoms, for example, alkyl groups such as methyl, ethyl, propyl and butyl, cycloalkyl groups such as cyclohexyl, alkenyl groups such as vinyl, allyl, butenyl and hexenyl, aryl groups such as phenyl and tolyl, aralkyl groups such as benzyl and β-phenylpropyl, and substituted ones of the foregoing groups in which some or all of the hydrogen atoms attached to carbon atoms are replaced by halogen atoms, cyano groups or the like, such as chloromethyl, trifluoropropyl and cyanoethyl. The letter "a" is a positive number of 1.8 to 2.3, preferably 1.95 to 2.05. The organopolysiloxane should preferably have at least two alkenyl groups attached to silicon atoms in a molecule. The content of alkenyl groups is preferably 0.001 to 5 mol %, especially 0.01 to 0.5 mol % based on the $R^1$ groups. With respect to the molecular structure, the organopolysiloxane is generally of straight chain although it may have in part branched siloxane skeletons. The degree of polymerization is in the range which is known in the art as the range of organopolysiloxane gum, and typically in the range of about 3,000 to 20,000, especially about 5,000 to 10,000. The organopolysiloxane is preferably end-capped with a triorganosilyl group such as vinyldimethylsilyl, divinylmethylsilyl or trivinylsilyl.

Component (B) is an inorganic filler which may be selected from conventional fillers used in silicone rubber. Useful fillers include finely divided silica, quartz flour, magnesium oxide, diatomaceous earth, calcium carbonate, and carbon black, with the finely divided silica being preferred. Silica powder has a specific surface area as measured by the BET method of at least 50 $m^2/g$, especially 100 to 400 $m^2/g$. Wet silica and fumed silica (dry silica) are especially preferred. For wire coating compositions and sponge compositions, fumed silica is preferred among others. Reinforcing silica which can be used herein is commercially available under the trade name of Aerosil 130, 200, 300 and 380 from Nippon Aerosil K.K., Cab-O-Sil MS-5, MS-7, HS-5 and HS-7 from Cabot Corp., Santocel FRC and CS from Monsanto Co., and Nipsil VN-3 from Nippon Silica Industry K.K. These fillers may be used with or without surface treatment with organopolysiloxanes, organopolysilazanes, chlorosilanes or alkoxysilanes. The amount of the filler used herein is not critical and preferably ranges from about 5 to 200 parts by weight per 100 parts by weight of the organopolysiloxane (A). An appropriate amount of finely divided silica is about 5 to 100 parts, more preferably about 10 to 90 parts, and especially about 30 to 80 parts by weight per 100 parts by weight of the organopolysiloxane (A).

Component (C) is an organic peroxide of the structural formula (2).

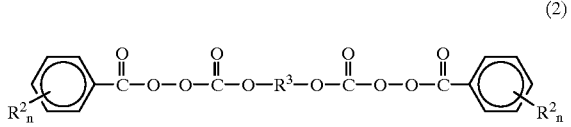

(2)

In formula (2), $R^2$ which may be the same or different is independently selected from hydrogen and alkyl groups, preferably of 1 to 8 carbon atoms, more preferably 1 to 4 carbon atoms, such as methyl, ethyl, propyl and butyl. $R^3$ is selected from alkylene groups, preferably of 1 to 12 carbon atoms, more preferably 2 to 8 carbon atoms, such as methylene, ethylene, propylene, butylene and hexylene. The letter n is an integer of 1 to 3.

Specifically the organic peroxides of structural formula (2) include 1,6-bis(p-toluoylperoxycarbonyloxy)-hexane of the following structural formula (3), 1,6-bis (benzoylperoxycarbonyloxy)hexane of the following structural formula (4), 1,6-bis(p-toluoylperoxycarbonyloxy) butane, and 1,6-bis(2,4-dimethylbenzoylperoxycarbonyloxy)hexane.

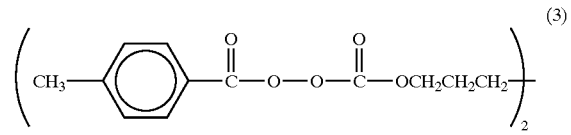

(3)

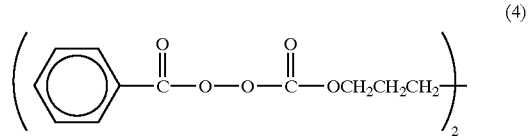

(4)

In order that the organic peroxide of formula (2) be admixed with a compound comprised of the organopolysiloxane (A) and the filler (B) in a safe manner, the organic peroxide may take the form of a paste in an inert carrier, preferably a diorganopolysiloxane compatible with the compound such as polydimethylsiloxane, prior to use. An appropriate amount of the organic peroxide of formula (2) is about 0.1 to 10 parts, and especially about 0.2 to 5 parts by weight per 100 parts by weight of the organopolysiloxane (A).

By blending (E) an organic blowing agent, the silicone rubber composition of the invention can be formulated as a silicone rubber sponge composition.

Examples of the organic blowing agent (E) include organic azo compounds such as azobisisobutyronitrile, 2,2'-azobis-2-methylbutyronitrile, 2,2'-azobis-2,4-dimethylvaleronitrile, 1,1'-azobis(1-acetoxy-1-phenylethane), and azodicarbonamide; nitroso compounds such as dinitropentamethylene tetramine; and hydrazine derivatives such as 4,4'-oxybis(benzenesulfonylhydrazide) and p-toluenesulfonyl hydrazine. Of these, the azo compounds are preferred, with azobisisobutyronitrile being especially preferred.

An appropriate amount of the blowing agent (E) blended is about 0.01 to 50 parts, and especially about 0.5 to 10 parts by weight per 100 parts by weight of the organopolysiloxane (A). Less than 0.01 part by weight of the blowing agent is ineffective for the blowing purpose whereas more than 50 parts by weight of the blowing agent may create large and uneven cells and fail to form a skin layer.

Another organic peroxide (D) may be blended herein insofar as the advantages of the invention are not impaired. Examples of the other organic peroxide are dialkyl organic peroxides and peroxy ester organic peroxides.

Especially in the silicone rubber sponge composition, a dialkyl peroxide and/or peroxy ester is preferably used in combination for the purposes of increasing a blowing magnification and creating more uniform cells. Examples include dicumyl peroxide, 2,5-dimethyl-bis(t-butylperoxyhexane), 2,5-dimethyl-2,5-bis(t-butylperoxy)hexyne, t-butylperoxy benzoate, and 1,6-bis(t-butylperoxycarbonyloxy)hexane.

An appropriate amount of the dialkyl peroxide and peroxy ester blended is about 0.1 to 10 parts, and especially about 0.2 to 5 parts by weight per 100 parts by weight of the organopolysiloxane (A).

In the silicone rubber sponge composition, an addition type crosslinking agent may be additionally used for the purposes of creating more uniform cells and improving the compression set of the sponge. Well-known addition type crosslinking agents are useful, and combinations of platinum group catalysts with organohydrogenpolysiloxane having at least two SiH groups in a molecule are often used.

The platinum group catalyst may be any of well-known addition reaction catalysts, for example, metal elements of the platinum group and compounds thereof. Examples include microparticulate platinum metal adsorbed on supports such as silica, alumina and silica gel, platinic chloride, chloroplatinic acid, complexes of chloroplatinic acid hexahydrate with olefins or divinyldimethylpolysiloxane, alcohol solutions of chloroplatinic acid hexahydrate, palladium catalysts, and rhodium catalysts. The catalyst is used in a catalytic amount, and typically in an amount of about 1 to 2,000 ppm, preferably about 10 to 500 ppm of platinum group metal. Less than 1 ppm fail to fully promote crosslinking reaction and result in undercure whereas more than 2,000 ppm affects reactivity little further and is uneconomical.

The organohydrogenpolysiloxane having at least two SiH groups in a molecule may be straight, cyclic or branched. There may be used any of organohydrogenpolysiloxanes well known as the curing agent in addition reaction curing type silicone rubber compositions although an organohydrogenpolysiloxane of the following average compositional formula (5) is often useful.

$$R^4_x H_y SiO_{(4-x-y)/2} \tag{5}$$

Herein $R^4$ is a substituted or unsubstituted monovalent hydrocarbon group as defined for $R^1$, preferably of 1 to 12 carbon atoms, especially 1 to 8 carbon atoms, for example, alkyl, alkenyl, aryl and aralkyl groups, and halogen- and cyano-substituted groups thereof. The letter x is a positive number of from 1 to 2.2, y is a positive number of from 0.002 to 1, and the sum of x+y is from 1.002 to 3. The organohydrogenpolysiloxane has in a molecule at least two, preferably at least three SiH groups, which may be positioned at ends or midway of the molecular chain. Its viscosity is preferably less than about 300 centistokes at 25° C. An appropriate amount of organohydrogenpolysiloxane blended is about 0.01 to 10 parts by weight per 100 parts by weight of the organopolysiloxane (A). More preferably the organohydrogenpolysiloxane is added in such amounts that the ratio of silicon atom-bonded hydrogen atoms to alkenyl groups in component (A) may be from 0.5 to 10, especially from 1 to 4. A hydrogen/alkenyl ratio of less than 0.5 may lead to insufficient crosslinking and insufficient mechanical strength whereas a hydrogen/alkenyl ratio of more than 10 may cause deterioration of cured physical properties and especially, substantial losses of heat resistance and compression set.

In the silicone rubber composition and silicone rubber sponge composition according to the invention, flame retardants, fire resistance modifiers, heat resistance modifiers, and coloring agents may be blended, if necessary, as well as dispersants such as alkoxysilanes, carbon functional silanes, and silanol group-bearing low molecular weight siloxanes.

Where the silicone rubber composition is used for the coating of an electrically insulated wire, an adhesion inhibitor and/or heat resistance modifier is preferably blended therein. These additives are customarily used in conventional wire-coating silicone rubber compositions and effective for the purposes of preventing close adhesion to the conductor such as a copper conductor or tin-plated copper conductor and improving the heat resistance, respectively.

Examples of the adhesion inhibitor include paraffins and hydrocarbon resins such as paraffin wax and microcrystalline wax; fatty acids and metal salts thereof such as stearic acid, zinc stearate and calcium stearate; fatty acid amides such as stearamide and methylenebis-stearamide; fatty acid esters such as n-butyl stearate; and ester waxes. Desirably, the adhesion inhibitor is added in an amount of about 0.001 to 5 parts, especially about 0.05 to 1 part by weight per 100 parts by weight of the organopolysiloxane (A). Less than 0.001 part of the adhesion inhibitor may allow the composition to closely bond to the conductor and be ineffective for its purpose. More than 5 parts may sometimes adversely affect the physical properties of rubber.

Examples of the heat resistance modifier include metal oxides such as iron oxide, cerium oxide, zinc oxide, and titanium oxide; cerium silanolate and cerium fatty acid salts. Desirably, the heat resistance modifier is added in an amount of about 0.01 to 5 parts, especially about 0.2 to 3 parts by weight per 100 parts by weight of the organopolysiloxane (A). Less than 0.01 part of the heat resistance modifier may be ineffective for its purpose whereas more than 5 parts may achieve no further improvement in heat resistance.

The composition of the invention may be prepared by uniformly mixing the above essential and optional components in a rubber mixer such as a twin-roll mill, Banbury mixer or dough mixer (kneader), followed by optional heat treatment.

With respect to the molding and vulcanization of the composition, any desired vulcanizing method may be used as long as it can apply a sufficient amount of heat to decompose the curing agent. Suitable molding methods include continuous atmospheric hot air vulcanization in line with extrusion molding, press vulcanization, and injection vulcanization and are not limited thereto. In the practice of the invention, atmospheric hot air vulcanization is advantageously employed. Appropriate conditions therefor include a temperature of about 100 to 500° C., especially about 150 to 400° C. and a time of about several seconds to 1 hour, especially about 10 seconds to 30 minutes. If necessary, this is followed by secondary vulcanization at about 150 to 250° C. for about 1 to 10 hours.

A silicone rubber-covered wire is manufactured by continuously feeding the composition around a wire, typically a copper wire or tin-plated copper wire through an extruder, followed by atmospheric hot air vulcanization in a hot air furnace. If the vulcanization temperature is below 200° C., there is a possibility that vulcanization be retarded and micro-voids form. A vulcanization temperature above 550° C. may cause over-vulcanization and hence, surface cracks. For this reason, the temperature of the heating furnace is preferably set in the range of about 200 to 550° C., especially about 250 to 500° C., and the residence time within the furnace is preferably set in the range of about 1 to 300 seconds, especially about 5 to 50 seconds. The hot air vulcanization furnace may be combined with a radiation heating furnace such as a UHF vulcanization furnace or electron beam vulcanization furnace.

There has been described a silicone rubber composition which has a high vulcanization rate and hygienic safety, and can be extrusion vulcanized in a continuous atmospheric hot air vulcanization manner into a cured silicone rubber having satisfactory physical properties without generating voids or surface tack. When the composition is applied to a wire to construct a silicone rubber-covered wire, the coating has improved withstand voltage properties because of the absence of micro-voids and requires no dusting powder because of the eliminated surface tack. The coating allows for smooth cut/stripping required on the processing of wire terminal ends.

Since halogen-free organic peroxides are used, the silicone rubber sponge composition is safe and effectively expandable and can be cured, without a need for a long term of post curing, into a silicone rubber sponge having uniform fine cells and a skin layer with a smooth, tack-free surface.

EXAMPLE

Examples of the invention are given below by way of illustration and not by way of limitation.

Example 1

Compound 1 was prepared by milling 100 parts by weight of an organopolysiloxane consisting of 99.850 mol % of dimethylsiloxane units, 0.125 mol % of methylvinylsiloxane units and 0.025 mol % of dimethylvinylsiloxane units and having an average degree of polymerization of about 8000, 45 parts by weight of fumed silica having a specific surface area of 200 m$^2$/g (Aerosil 200 by Nippon Aerosil K.K.), and 10 parts by weight of both end silanol group-blocked dimethylpolysiloxane having an average degree of polymerization of 13 and a viscosity of 15 centistokes at 25° C. as the dispersant in a kneader, and heat treating the mixture at 180° C. for 3 hours.

Using a two-roll mill, 100 parts by weight of Compound 1 was blended with 1.0 part by weight of a 50% silicone oil paste of 1,6-bis(p-toluoylperoxycarbonyloxy)hexane as the curing agent. A sheet of 2 mm thick was formed therefrom and heat treated at 250° C. for 10 minutes.

The silicone rubber sheet was examined for surface tack and expanded state in cross section, with the results shown in Table 1.

Comparative Example 1

Using a two-roll mill, 100 parts by weight of Compound 1 was blended with 1.0 part by weight of a 50% silicone oil paste of bis(p-methylbenzoyl)peroxide as the curing agent. A sheet of 2 mm thick was formed therefrom and heat treated at 250° C. for 10 minutes.

The silicone rubber sheet was examined for surface tack and expanded state in cross section, with the results shown in Table 1.

Comparative Example 2

Using a two-roll mill, 100 parts by weight of Compound 1 was blended with 0.5 part by weight of 1,3-bis(t-butylperoxycarbonyloxy)-2,2-dimethylpropane as the curing agent. A sheet of 2 mm thick was formed therefrom and heat treated at 250° C. for 10 minutes.

The silicone rubber sheet was examined for surface tack and expanded state in cross section, with the results shown in Table 1.

Comparative Example 3

Using a two-roll mill, 100 parts by weight of Compound 1 was blended with 1.0 part by weight of a 50% silicone oil paste of bis(2,4-dichlorobenzoyl)peroxide as the curing agent. A sheet of 2 mm thick was formed therefrom and heat treated at 250° C. for 10 minutes.

The silicone rubber sheet was examined for surface tack and expanded state in cross section, with the results shown in Table 1.

TABLE 1

| | Curing agent | Tack | Expanded |
|---|---|---|---|
| E1 | 1,6-bis(p-toluoylperoxy-carbonyloxy)hexane | No | No |
| CE1 | bis(p-methylbenzoyl)peroxide | No | Yes |
| CE2 | 1,3-bis(t-butylperoxycarbonyloxy)-2,2-dimethylpropane | No | Yes |
| CE3 | bis(2,4-dichlorobenzoyl)peroxide | No | No |

Example 2

Using a two-roll mill, 100 parts by weight of Compound 1 was blended with 1.0 part by weight of a 50% silicone oil paste of 1,6-bis(p-toluoylperoxycarbonyloxy)hexane as the curing agent. This was press cured at 120° C. for 10 minutes and post cured at 200° C. for 4 hours. The physical properties of the sample were measured, with the results shown in Table 2.

Comparative Example 4

Using a two-roll mill, 100 parts by weight of Compound 1 was blended with 1.0 part by weight of a 50% silicone oil paste of bis(p-methylbenzoyl)peroxide as the curing agent. This was press cured at 120° C. for 10 minutes and post cured at 200° C. for 4 hours. The physical properties of the sample were measured, with the results shown in Table 2.

Comparative Example 5

Using a two-roll mill, 100 parts by weight of Compound 1 was blended with 0.5 part by weight of 1,3-bis(t- butylperoxycarbonyloxy)-2,2-dimethylpropane as the curing agent. This was press cured at 120° C. for 10 minutes and post cured at 200° C. for 4 hours. The physical properties of the sample were measured, with the results shown in Table 2.

Comparative Example 6

Using a two-roll mill, 100 parts by weight of Compound 1 was blended with 1.0 part by weight of a 50% silicone oil paste of bis(2,4-dichlorobenzoyl)peroxide as the curing agent. This was press cured at 120° C. for 10 minutes and post cured at 200° C. for 4 hours. The physical properties of the sample were measured, with the results shown in Table 2.

TABLE 2

|  | Curing agent | Hardness (Type A) | Tensile strength (MPa) | Elongation at break (%) |
| --- | --- | --- | --- | --- |
| E2 | 1,6-bis(p-toluoylperoxycarbonyloxy)hexane | 60 | 10.1 | 520 |
| CE4 | bis(p-methylbenzoyl)peroxide | 61 | 9.4 | 480 |
| CE5 | 1,3-bis(t-butylperoxycarbonyloxy)-2,2-dimethylpropane | 58 | 9.5 | 530 |
| CE6 | bis(2,4-dichlorobenzoyl)peroxide | 60 | 9.8 | 530 |

Example 3

Using a two-roll mill, 100 parts by weight of Compound 1 was blended with 1.0 part by weight of a 50% silicone oil paste of 1,6-bis(p-toluoylperoxycarbonyloxy)hexane as the curing agent. Using a moving die rheometer, the vulcanization rates T10 and T90 at 120° C. of the sample were measured. It is noted that T10 and T90 are times taken until the torque reaches 10% and 90% of the maximum torque, respectively. The results are shown in Table 3.

Comparative Example 7

Using a two-roll mill, 100 parts by weight of Compound 1 was blended with 1.0 part by weight of a 50% silicone oil paste of bis(p-methylbenzoyl)peroxide as the curing agent. Using the moving die rheometer, the vulcanization rates T10 and T90 at 120° C. of the sample were measured. The results are shown in Table 3.

Comparative Example 8

Using a two-roll mill, 100 parts by weight of Compound 1 was blended with 0.5 part by weight of 1,3-bis(t-butylperoxycarbonyloxy)-2,2-dimethylpropane as the curing agent. Using the moving die rheometer, the vulcanization rates T10 and T90 at 120° C. of the sample were measured. The results are shown in Table 3.

Comparative Example 9

Using a two-roll mill, 100 parts by weight of Compound 1 was blended with 1.0 part by weight of a 50% silicone oil paste of bis(2,4-dichlorobenzoyl)peroxide as the curing agent. Using the moving die rheometer, the vulcanization rates T10 and T90 at 120° C. of the sample were measured. The results are shown in Table 3.

TABLE 3

|  | Curing agent | T10 (min) | T90 (min) |
| --- | --- | --- | --- |
| E3 | 1,6-bis(p-toluoylperoxy-carbonyloxy)hexane | 0.25 | 0.63 |
| CE7 | bis(p-methylbenzoyl)peroxide | 0.55 | 2.23 |
| CE8 | 1,3-bis(t-butylperoxycarbonyloxy)-2,2-dimethylpropane | 1.72 | 8.53 |
| CE9 | bis(2,4-dichlorobenzoyl)peroxide | 0.32 | 0.70 |

Example 4

Hundred parts by weight of a heat-curable silicone rubber compound (KE904FU by Shin-Etsu Chemical Co., Ltd.) loaded with about 25% by weight of reinforcing finely divided silica powder was blended with 2 parts by weight of azobisisobutyronitrile and 1.0 part by weight of a 50% silicone oil paste of 1,6-bis(p-toluoylperoxycarbonyloxy)hexane. Using a two-roll mill, a sheet of 2 mm thick was formed therefrom. The sheet was heated at 250° C. for 10 minutes. The sponge thus obtained had a blowing magnification of 500%, no coloring, uniform cells with a size of less than 1 mm, and a smooth, tack-free surface. The sponge exhibited a compression set of 20% after 50% compression at 180° C. and 22 hours.

Example 5

Hundred parts by weight of a heat-curable silicone rubber compound (KE904FU by Shin-Etsu Chemical Co., Ltd.) was blended with 2 parts by weight of azobisisobutyronitrile, 1.0 part by weight of a 50% silicone oil paste of 1,6-bis(p-toluoylperoxycarbonyloxy)hexane, and 0.6 part by weight of dicumyl peroxide. Using a two-roll mill, a sheet of 2 mm thick was formed therefrom. The sheet was heated at 250° C. for 10 minutes. The sponge thus obtained had a blowing magnification of 600%, no coloring, uniform cells with a size of less than 1 mm, and a smooth, tack-free surface. The sponge exhibited a compression set of 15% after 50% compression at 180° C. and 22 hours.

Example 6

Hundred parts by weight of a heat-curable silicone rubber compound (KE904FU by Shin-Etsu Chemical Co., Ltd.) was blended with 2 parts by weight of azobisisobutyronitrile, 1.0 part by weight of a 50% silicone oil paste of 1,6-bis(p-toluoylperoxycarbonyloxy)hexane, 0.5 part by weight of a polyvinylsiloxane complex of a platinum compound, 0.05 part by weight of 1-ethynylcyclohexan-1-ol, and 1.0 part by weight of a both end trimethylsiloxy group-blocked dimethylsiloxane/methylhydrogensiloxane copolymer (Si—H 0.007 mol/g). Using a two-roll mill, a sheet of 2 mm thick was formed therefrom. The sheet was heated at 250° C. for 10 minutes. The sponge thus obtained had a blowing magnification of 450%, no coloring, uniform cells with a size of less than 1 mm, and a smooth, tack-free surface. The sponge exhibited a compression set of 10% after 50% compression at 180° C. and 22 hours.

Example 7

Hundred parts by weight of a heat-curable silicone rubber compound (KE904FU by Shin-Etsu Chemical Co., Ltd.) was blended with 2 parts by weight of azobisisobutyronitrile, 1.0 part by weight of a 50% silicone oil paste of 1,6-bis(p-toluoylperoxycarbonyloxy)hexane, and 0.6 part by weight of dicumyl peroxide. Using a two-roll mill, a sheet of 2 mm thick was formed therefrom. The sheet was heated at 250° C. for 10 minutes. The sponge thus obtained had a blowing magnification of 600%, no coloring, uniform cells with a size of less than 1 mm, and a smooth, tack-free surface. The sponge exhibited a compression set of 20% after 50% compression at 180° C. and 22 hours.

Comparative Example 10

Hundred parts by weight of a heat-curable silicone rubber compound (KE904FU by Shin-Etsu Chemical Co., Ltd.) was blended with 2 parts by weight of azobisisobutyronitrile and 0.6 part by weight of dicumyl peroxide. Using a two-roll mill, a sheet of 2 mm thick was formed therefrom. The sheet was heated at 250° C. for 10 minutes. The sponge thus obtained had a blowing magnification of 250% and non-uniform cells with a size of more than 1 mm.

Comparative Example 11

Hundred parts by weight of a heat-curable silicone rubber compound (KE904FU by Shin-Etsu Chemical Co., Ltd.) was blended with 2 parts by weight of azobisisobutyronitrile, 0.5 part by weight of a polyvinylsiloxane complex of a platinum compound, 0.05 part by weight of 1-ethynylcyclohexan-1-ol, and 1.0 part by weight of a both end trimethylsiloxy group-blocked dimethylsiloxane/methyl-hydrogensiloxane copolymer (Si—H 0.007 mol/g). Using a two-roll mill, a sheet of 2 mm thick was formed therefrom. The sheet was heated at 250° C. for 10 minutes. The sponge thus obtained had a blowing magnification of 200% and non-uniform cells with a size of more than 1 mm.

Example 8

Compound 2 was prepared by milling 100 parts by weight of an organopolysiloxane consisting of 99.825 mol % of dimethylsiloxane units, 0.15 mol % of methylvinylsiloxane units and 0.025 mol % of dimethylvinylsiloxane units and having an average degree of polymerization of about 8000, 45 parts by weight of fumed silica having a specific surface area of 200 m$^2$/g (Aerosil 200 by Nippon Aerosil K.K.), and 10 parts by weight of both end silanol group-blocked dimethylpolysiloxane having an average degree of polymerization of 13 and a viscosity of 15 centistokes at 25° C. as the dispersant in a kneader, and heat treating the mixture at 180° C. for 3 hours.

Hundred parts by weight of Compound 2 was blended with 1.5 parts by weight of azobisisobutyronitrile as the blowing agent, 1.0 part by weight of a 50% silicone oil paste of 1,6-bis(p-toluoylperoxycarbonyloxy)hexane and 0.6 part by weight of dicumyl peroxide. Using a two-roll mill, a sheet of 2 mm thick was formed therefrom, followed by heat treatment at 250° C. for 10 minutes. The sponge thus obtained had a blowing magnification of 400%, no coloring, uniform cells with a size of about 200 μm, and a smooth, tack-free surface. The sponge exhibited a compression set of 10% after 50% compression at 180° C. and 22 hours.

Example 9

Hundred parts by weight of Compound 2 was blended with 1.5 parts by weight of azobisisobutyronitrile as the blowing agent, 1.0 part by weight of a 50% silicone oil paste of 1,6-bis(p-toluoylperoxycarbonyloxy)butane and 0.6 part by weight of dicumyl peroxide. Using a two-roll mill, a sheet of 2 mm thick was formed therefrom, followed by heat treatment at 250° C. for 10 minutes. The sponge thus obtained had a blowing magnification of 450%, no coloring, uniform cells with a size of about 300 μm, and a smooth, tack-free surface. The sponge exhibited a compression set of 15% after 50% compression at 180° C. and 22 hours.

Examples 10–11 and Comparative Examples 12–13

Compound 3 was prepared by milling 100 parts by weight of an organopolysiloxane consisting of 99.850 mol % of dimethylsiloxane units, 0.125 mol % of methylvinylsiloxane units and 0.025 mol % of dimethylvinylsiloxane units and having an average degree of polymerization of about 8000, 40 parts by weight of fumed silica having a specific surface area of 200 m$^2$/g (Aerosil 200 by Nippon Aerosil K.K.), 30 parts by weight of diatomaceous earth Celite SF (John Manville), and 10 parts by weight of both end silanol group-blocked dimethylpolysiloxane having an average degree of polymerization of 13 and a viscosity of 15 centistokes at 25° C. as the dispersant in a kneader, and heat treating the mixture at 180° C. for 3 hours.

Using a two-roll mill, 100 parts by weight of Compound 3 was blended with 1.0 part by weight of a 50% silicone oil paste of 1,6-bis(p-toluoylperoxycarbonyloxy)hexane as the curing agent. This is designated silicone rubber composition 1.

Using a two-roll mill, 100 parts by weight of Compound 3 was blended with 1.0 part by weight of a 50% silicone oil paste of 1,6-bis(benzoylperoxycarbonyloxy)hexane as the curing agent. This is designated silicone rubber composition 2.

Using a two-roll mill, 100 parts by weight of Compound 3 was blended with 1.0 part by weight of a 50% silicone oil paste of bis(o-methylbenzoyl)peroxide as the curing agent. This is designated silicone rubber composition 3.

Using a two-roll mill, 100 parts by weight of Compound 3 was blended with 1.0 part by weight of a 50% silicone oil paste of bis(p-methylbenzoyl)peroxide as the curing agent. This is designated silicone rubber composition 4.

Using a 40-mm diameter extruder, each of silicone rubber compositions 1 to 4 was extrusion molded into a rod having a diameter of 6 mm. The rod was subjected to atmospheric hot air vulcanization at 380° C. for 13 seconds and the cured rod was examined for micro-voids by the test procedure to be described below. Separately, using a 40-mm diameter extruder, each of silicone rubber compositions 1 to 4 was molded around a tin-plated soft copper conductor of diameter 0.6 mm, forming a covered wire having an outer diameter of 1.2 mm. The coating was subjected to atmospheric hot air vulcanization at 450° C. for 30 seconds and the covered wire was examined by the withstand voltage test to be described below. The results are shown in Table 4.

Using a disk rheometer, the silicone rubber compositions 1 to 4 were examined for vulcanizing property according to the measurement procedure to be described below. The results are shown in Table 5.

Measurement Methods

Vulcanizing Property

Using a disk rheometer (Monsanto Co.), a torque was measured at 120° C. and a deflection angle of ±3°.

Micro-Voids

A silicone rubber composition to be tested was extrusion molded through a 40-mm diameter extruder into a rod having a diameter of 6 mm, which was passed through a vulcanizing furnace at 380° C. for a residence time of 13 seconds for effecting atmospheric hot air vulcanization. A cross section of the cured rod was observed under an optical microscope with a magnifying power of X100 to inspect micro-voids.

Breakdown Strength

Using a 40-mm diameter extruder, a silicone rubber composition to be tested was molded around a tin-plated soft copper conductor of diameter 0.6 mm, forming a covered wire having an outer diameter of 1.2 mm. This was subjected to atmospheric hot air vulcanization at 450° C. for 30 seconds. In this way, ten samples were prepared from each composition. The samples were examined by a withstand voltage test in water according to JIS C-3004.

Cut/Stripping

Using a 40-mm diameter extruder, a silicone rubber composition to be tested was molded around a tin-plated soft copper conductor of diameter 0.6 mm, forming a covered wire having an outer diameter of 1.2 mm. This was subjected to atmospheric hot air vulcanization at 450° C. for 30 seconds. The covered wire was examined for ease of stripping of the rubber coating. The jig used for examining cut/stripping was a special jig comprising a radio pliers-shaped clamp combined with a cutting edge for cutting off the rubber coating. It was visually observed how much the rubber was left on the conductor surface where stripped.

TABLE 4

|  | Micro-voids | Breakdown strength (kV/mm) |
|---|---|---|
| E10 (Composition 1) | nil | 25 |
| E11 (Composition 2) | nil | 25 |
| CE12 (Composition 3) | found | 22 |
| CE13 (Composition 4) | found | 21 |

The samples of the silicone rubber compositions within the scope of the invention exhibited a higher withstand voltage than the comparative examples.

TABLE 5

|  | T10 (induction time, min) | T90 (appropriate crosslinking time, min) |
|---|---|---|
| E10 (Composition 1) | 0.26 | 0.76 |
| E11 (Composition 2) | 0.29 | 0.76 |
| CE12 (Composition 3) | 0.42 | 1.72 |
| CE13 (Composition 4) | 0.59 | 2.58 |

Examples 12–13 and Comparative Examples 14–15

Compound 4 was prepared by milling 100 parts by weight of an organopolysiloxane consisting of 99.850 mol % of dimethylsiloxane units, 0.125 mol % of methylvinylsiloxane units and 0.025 mol % of dimethylvinylsiloxane units and having an average degree of polymerization of about 8000, 50 parts by weight of fumed silica having a specific surface area of 200 m²/g treated with dichlorodimethylsilane (Aerosil R-972 by Nippon Aerosil K.K.), and 3 parts by weight of both end silanol group-blocked dimethylpolysiloxane having an average degree of polymerization of 13 and a viscosity of 15 centistokes at 25° C. as the dispersant in a kneader, heat treating the mixture at 180° C. for 3 hours, and further blending therein 0.1 part by weight of zinc stearate and 1.0 part by weight of cerium oxide.

Using a two-roll mill, 100 parts by weight of Compound 4 was blended with 1.0 part by weight of a 50% silicone oil paste of 1,6-bis(p-toluoylperoxycarbonyloxy)hexane as the curing agent. This is designated silicone rubber composition 5.

Using a two-roll mill, 100 parts by weight of Compound 4 was blended with 1.0 part by weight of a 50% silicone oil paste of 1,6-bis(benzoylperoxycarbonyloxy)hexane as the curing agent. This is designated silicone rubber composition 6.

Using a two-roll mill, 100 parts by weight of Compound 4 was blended with 1.0 part by weight of a 50% silicone oil paste of bis(o-methylbenzoyl)peroxide as the curing agent. This is designated silicone rubber composition 7.

Using a two-roll mill, 100 parts by weight of Compound 4 was blended with 1.0 part by weight of a 50% silicone oil paste of bis(p-methylbenzoyl)peroxide as the curing agent. This is designated silicone rubber composition 8.

Using a 40-mm diameter extruder, each of silicone rubber compositions 5 to 8 was extrusion molded into a rod having a diameter of 6 mm. The rod was subjected to atmospheric hot air vulcanization at 380° C. for 13 seconds and the cured rod was examined for micro-voids by the above test procedure. Separately, using a 40-mm diameter extruder, each of silicone rubber compositions 5 to 8 was molded around a tin-plated soft copper conductor of diameter 0.6 mm, forming a covered wire having an outer diameter of 1.2 mm. The coating was subjected to atmospheric hot air vulcanization at 450° C. for 30 seconds, and the covered wire was examined by the above withstand voltage test and cut/stripping test. The results are shown in Table 6.

TABLE 6

|  | Micro-voids | Breakdown strength (kV/mm) | Cut/stripping |
|---|---|---|---|
| E12 (Composition 5) | nil | 27 | good |
| E13 (Composition 6) | nil | 27 | good |
| CE14 (Composition 7) | found | 24 | fairly stuck |
| CE15 (Composition 8) | found | 22 | stuck |

The samples of the silicone rubber compositions within the scope of the invention exhibited a higher withstand voltage and better cut/stripping than the comparative examples.

Japanese Patent Application Nos. 2000-012899 and 2000-239304 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition comprising (A) an organopolysiloxane of the average compositional formula (1):

$$R^1{}_a SiO_{(4-a)/2} \quad (1)$$

wherein $R^1$ is a substituted or unsubstituted monovalent hydrocarbon group and "a" is a positive number of 1.8 to 2.3, (B) an inorganic filler, and
(C) an organic peroxide of the structural formula (2):

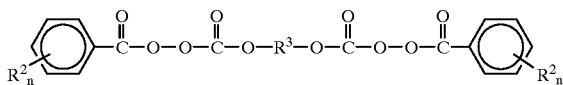

(2)

wherein $R^2$ is independently hydrogen or alkyl, $R^3$ is alkylene, and n is an integer of 1 to 3.

2. The composition of claim 1 wherein the inorganic filler (B) is finely divided silica.

3. The composition of claim 2 wherein the inorganic filler (B) is fumed silica.

4. The composition of claim 1 wherein the organic peroxide (C) is 1,6-bis(p-toluoylperoxycarbonyloxy)hexane of the following structural formula (3) or 1,6-bis (benzoylperoxycarbonyloxy)hexane of the following structural formula (4):

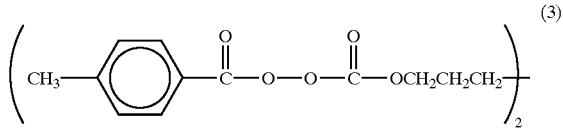

(3)

and

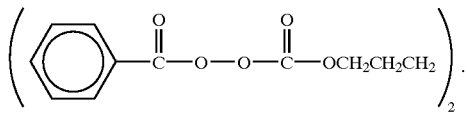

(4)

5. The composition of claim 1 further comprising (D) a dialkyl organic peroxide or peroxy ester organic peroxide or a mixture thereof.

6. A combination comprising an electrical wire covered by the composition of claim 1.

7. A silicone rubber-covered wire comprising a wire in the form of a copper wire or tin-plated copper wire around which the silicone rubber composition of claim 1 has been extrusion molded.

8. A silicone rubber sponge composition comprising the silicone rubber composition of claim 1, and (E) an organic blowing agent.

9. The silicone rubber sponge composition of claim 8, wherein component (E) is an organic azo compound.

10. The silicone rubber composition of claim 1, wherein the content of alkenyl groups in component (A) is 0.01 to 0.5 mol% based on the R' groups.

11. The silicone rubber composition of claim 1, wherein the degree of polymerization is in the range of about 5,000 to 10,000.

12. The silicone rubber composition of claim 5, wherein component (D) is selected from the group consisting of dicumyl peroxide, 2,5-dimethyl-bis(t-butylperoxyhexane), 2,5-dimethyl-2,5-bis(t-butylperoxy)hexyne, t-butylperoxy benzoate, and 1,6-bis(t-butylperoxycarbonyloxy)hexane.

13. A silicone rubber-covered wire comprising a wire in the form of a copper wire or tin-plated copper wire around which the silicone rubber composition of claim 1 has been extrusion molded, wherein organic peroxide component (C) comprises 1,6-bis(p-toluoylperoxycarbonyloxy)hexane.

14. A silicone rubber-covered wire comprising a wire in the form of a copper wire or tin-plated copper wire around which the silicone rubber composition of claim 1 has been extrusion molded, wherein organic peroxide component (C) comprises 1,6-bis(benzoylperoxycarbonyloxy)hexane.

* * * * *